US012563583B2

(12) United States Patent
Wang et al.

(10) Patent No.: US 12,563,583 B2
(45) Date of Patent: Feb. 24, 2026

(54) CHANNEL STATE INFORMATION REFERENCE SIGNAL CONFIGURATION FOR HIGH VELOCITY

(71) Applicant: MEDIATEK INC., Hsin-Chu (TW)

(72) Inventors: Chien-Yi Wang, Hsin-Chu (TW);
Jiann-Ching Guey, Hsin-Chu (TW)

(73) Assignee: MediaTek Inc., Hsin-chu (TW)

( * ) Notice: Subject to any disclaimer, the term of this patent is extended or adjusted under 35 U.S.C. 154(b) by 628 days.

(21) Appl. No.: 17/825,424

(22) Filed: May 26, 2022

(65) Prior Publication Data

US 2023/0007659 A1      Jan. 5, 2023

Related U.S. Application Data

(60) Provisional application No. 63/218,437, filed on Jul. 5, 2021.

(51) Int. Cl.
*H04W 72/542* (2023.01)
*H04L 1/08* (2006.01)
(Continued)

(52) U.S. Cl.
CPC ............. *H04W 72/542* (2023.01); *H04L 1/08* (2013.01); *H04L 5/0051* (2013.01); *H04W 72/0446* (2013.01); *H04W 72/23* (2023.01)

(58) Field of Classification Search
CPC ............... H04W 72/542; H04W 72/23; H04W 72/0446; H04W 24/08; H04L 1/08;
(Continued)

(56) References Cited

U.S. PATENT DOCUMENTS 11,202,217 B2 * 12/2021 Kim ...................... H04L 5/0057
2015/0215929 A1 * 7/2015 Damnjanovic ....... H04W 72/21
370/241

(Continued)

FOREIGN PATENT DOCUMENTS

CN          110268667 A      9/2019
CN          110291747 A      9/2019
(Continued)

OTHER PUBLICATIONS

Dahlman, Parkvall and Skold, 5G NR: The Next Generation Wireless Access Technology, AP, 1st edition, 2018.*
(Continued)

*Primary Examiner* — Charles C Jiang
*Assistant Examiner* — Rachel Elizabeth Marks
(74) *Attorney, Agent, or Firm* — Helen Mao; Zheng Jin; Imperium Patent Works

(57) ABSTRACT

A method of providing channel state information (CSI) reference signal (RS) configuration is proposed to support high velocity in new radio (NR) systems. A CSI-RS resource can be configured with a bursty period in which the same CSI-RS resource is repeatedly transmitted over time. Any two repetitions of the CSI-RS resource are not overlapped in time. For periodic and semi-persistent CSI-RS, the repetitions of CSI-RS in the bursty period can be signalled by radio resource control (RRC) signaling. For aperiodic CSI-RS, the CSI-RS repetitions in the bursty period can be indicated by the triggering downlink control information (DCI). UE can acquire Doppler-domain information based on the CSI-RS repetition to facilitate high velocity scenarios in 5G NR systems.

20 Claims, 5 Drawing Sheets

(51) Int. Cl.
| | |
|---|---|
| *H04L 5/00* | (2006.01) |
| *H04W 72/0446* | (2023.01) |
| *H04W 72/23* | (2023.01) |

(58) Field of Classification Search
CPC ... H04L 5/0051; H04L 1/0026; H04L 5/0057; H04L 5/0094; H04L 5/005; H04B 7/0626; H04B 17/30
See application file for complete search history.

(56) References Cited

U.S. PATENT DOCUMENTS

| | | | |
|---|---|---|---|
| 2018/0098234 A1 | 4/2018 | Kim | |
| 2020/0412430 A1* | 12/2020 | Song | H04L 5/0051 |
| 2021/0127389 A1 | 4/2021 | Liu | |
| 2021/0314128 A1 | 10/2021 | Li et al. | H04L 5/00 |
| 2023/0006793 A1* | 1/2023 | Wang | H04L 5/0051 |

FOREIGN PATENT DOCUMENTS

| | | | |
|---|---|---|---|
| CN | 112020841 A | 12/2020 | |
| CN | 112997418 A | 6/2021 | |
| CN | 113016151 A | 6/2021 | |
| EP | 3910995 A1 * | 11/2021 | .......... H04B 17/309 |
| WO | 2021028331 A1 | 2/2021 | |

OTHER PUBLICATIONS

Dahlman, 5G NR: The Next Generation Wireless Access Technology, AP, 1st edition, 2018 (Year: 2018).*

Taiwan IPO, office action for the Taiwanese patent application 111124905 (no English translation is available), dated Sep. 29, 2022 (8 pages).

China Intellectual Property Office Action 202210694421.3 Dated May 17, 2025.

China Intellectual Property Office Action 202210694421.3 Dated Oct. 17, 2025.

* cited by examiner

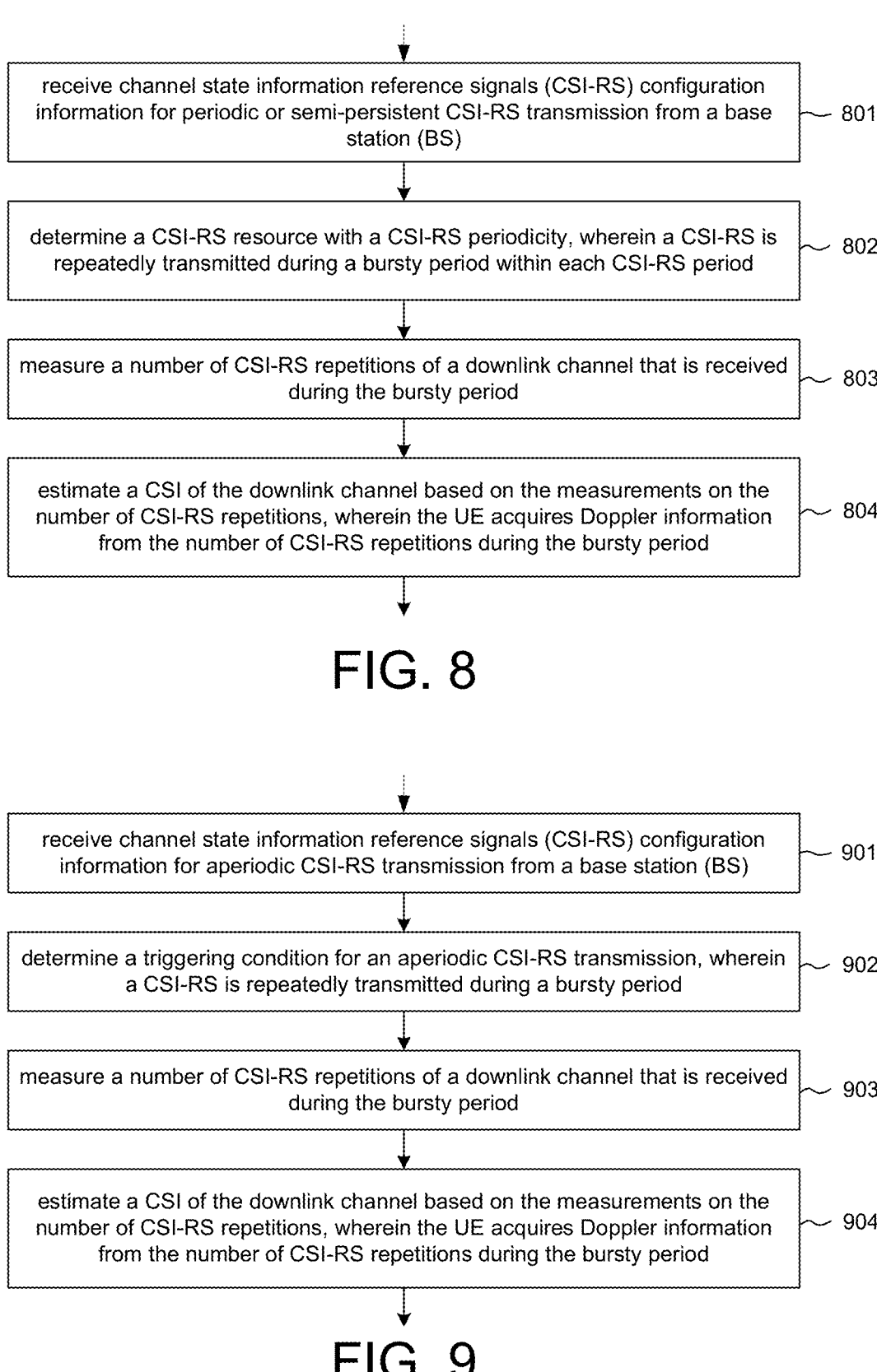

receive channel state information reference signals (CSI-RS) configuration information for periodic or semi-persistent CSI-RS transmission from a base station (BS) — 801 determine a CSI-RS resource with a CSI-RS periodicity, wherein a CSI-RS is repeatedly transmitted during a bursty period within each CSI-RS period — 802 measure a number of CSI-RS repetitions of a downlink channel that is received during the bursty period — 803 estimate a CSI of the downlink channel based on the measurements on the number of CSI-RS repetitions, wherein the UE acquires Doppler information from the number of CSI-RS repetitions during the bursty period — 804

FIG. 8 receive channel state information reference signals (CSI-RS) configuration information for aperiodic CSI-RS transmission from a base station (BS) — 901 determine a triggering condition for an aperiodic CSI-RS transmission, wherein a CSI-RS is repeatedly transmitted during a bursty period — 902 measure a number of CSI-RS repetitions of a downlink channel that is received during the bursty period — 903 estimate a CSI of the downlink channel based on the measurements on the number of CSI-RS repetitions, wherein the UE acquires Doppler information from the number of CSI-RS repetitions during the bursty period — 904

FIG. 9

CHANNEL STATE INFORMATION REFERENCE SIGNAL CONFIGURATION FOR HIGH VELOCITY

CROSS REFERENCE TO RELATED APPLICATIONS

This application claims priority under 35 U.S.C. § 119 from U.S. Provisional Application No. 63/218,437, entitled "Configuration for High Mobility," filed on Jul. 5, 2021, the subject matter of which is incorporated herein by reference.

TECHNICAL FIELD

The disclosed embodiments relate generally to mobile communication networks, and, more particularly, to methods for channel state information (CSI) reference signal (RS) configuration to support high velocity.

BACKGROUND

Fifth generation new radio (5G NR) is an improved radio access technology (RAT) that provides higher data rate, higher reliability, lower latency and improved system capacity. In NR systems, the terrestrial radio access network includes a plurality of base stations (BS), referred as next generation Node-Bs (gNBs), communicating with a plurality of mobile stations, referred as user equipment (UE). A UE may communicate with a base station (BS) or a gNB via the downlink and uplink. The downlink (DL) refers to the communication from the base station to the UE. The uplink (UL) refers to the communication from the UE to the base station. The 5G NR standard is developed by 3GPP. Channel State Information reference signals (CSI-RS) are utilized by UEs to measure and feedback the characteristics of a radio channel so that the gNB can use correct modulation, code rate, beam forming, etc. for DL data transmission.

In real developments, it is observed that the throughput drops significantly in high or medium velocity scenarios. One main reason is that the reported CSI becomes outdated due to fast channel variation. The CSI calculated for a past slot may not be useful at a later time when gNB needs to perform scheduling, especially in high velocity scenarios. To increase throughput, gNB needs to know the CSI that is good for future channels. The future CSI cannot be learned by a one-shot measurement as any channel variation requires at least two measurements to detect. The current NR specification supports consistent measurements for time/frequency tracking and beam management, but not for aperiodic CSI acquisition. For periodic and semi-persistent CSI-RS, the RRC parameter timeRestrictionForChannelMeasurements can be set to "not-Configured".

A solution is sought to provide CSI-RS configuration in NR to support high velocity.

SUMMARY

A method of providing channel state information (CSI) reference signal (RS) configuration is proposed to support high velocity in new radio (NR) systems. A CSI-RS resource can be configured with a bursty period in which the same CSI-RS resource is repeatedly transmitted over time. Any two repetitions of the CSI-RS resource are not overlapped in time. For periodic and semi-persistent CSI-RS, the CSI-RS repetitions in the bursty period can be configured by radio resource control (RRC) signaling. For aperiodic CSI-RS, the CSI-RS repetitions in the bursty period can be indicated by the triggering downlink control information (DCI). UE can acquire Doppler-domain information based on the CSI-RS repetition to facilitate high velocity scenarios in NR systems.

In one embodiment, a method of CSI-RS configuration for periodic or semi-persistent CSI-RS transmission supporting high velocity is provided. A UE receives channel state information reference signals (CSI-RS) configuration information for periodic or semi-persistent CSI-RS transmission from a base station (BS). The UE determines a CSI-RS resource with a CSI-RS periodicity, and a CSI-RS is repeatedly transmitted during a bursty period within each CSI-RS period. The UE measures a number of CSI-RS repetitions of a downlink channel that is received during the bursty period. The UE estimates a CSI of the downlink channel based on the measurements on the number of CSI-RS repetitions, wherein the UE acquires Doppler information from the number of CSI-RS repetitions during the bursty period.

In another embodiment, a method of CSI-RS configuration for aperiodic CSI-RS transmission supporting high velocity is provided. A UE receives channel state information reference signals (CSI-RS) configuration information for aperiodic CSI-RS transmission from a base station (BS). The UE determines a triggering condition for an aperiodic CSI-RS transmission, and a CSI-RS is repeatedly transmitted during a bursty period. The UE measures a number of CSI-RS repetitions of a downlink channel that is received during the bursty period. The UE estimates a CSI of the downlink channel based on the measurements on the number of CSI-RS repetitions. The UE acquires Doppler information from the number of CSI-RS repetitions during the bursty period.

Other embodiments and advantages are described in the detailed description below. This summary does not purport to define the invention. The invention is defined by the claims.

BRIEF DESCRIPTION OF THE DRAWINGS

FIG. 8 is a flow chart of method of CSI-RS configuration with bursty period and repetition for periodic or semi-persistent CSI-RS transmission supporting high velocity in accordance with one novel aspect.

FIG. 9 is a flow chart of method of CSI-RS configuration with bursty period and repetition for aperiodic CSI-RS transmission supporting high velocity in accordance with one novel aspect.

DETAILED DESCRIPTION

Reference will now be made in detail to some embodiments of the invention, examples of which are illustrated in the accompanying drawings.

Figures 1, 2:
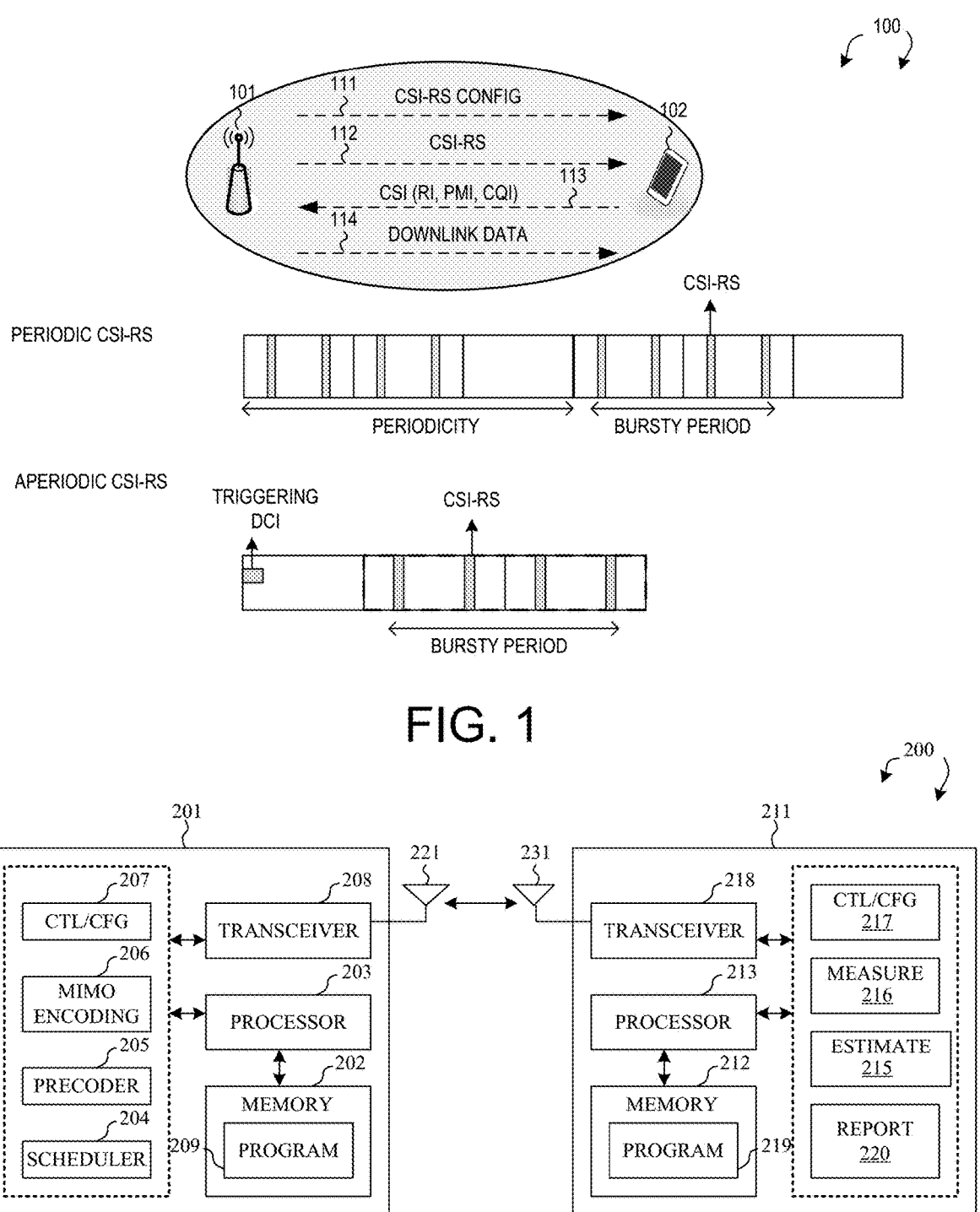
FIG. 1 illustrates a new radio (NR) mobile communication network with channel state information reference signal (CSI-RS) and resource configuration for high velocity in accordance with one novel aspect.
FIG. 2 is a simplified block diagram of a base station and a user equipment that carry out certain embodiments of the present invention.

FIG. 1 illustrates a new radio (NR) mobile communication network 100 with channel state information reference signal (CSI-RS) and resource configuration for high velocity in accordance with one novel aspect. Mobile communication network 100 is an OFDM network comprising a serving base station (gNB 101) and a user equipment (UE 102). In 3GPP NR system based on OFDMA downlink, the radio resource is partitioned into slots in time domain, each slot is comprised of a number of OFDM symbols. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into physical resource blocks (PRBs), where each RB consists of twelve consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in NR, while the Physical Downlink Control Channel (PDCCH) is used to carry downlink control information (DCI). The control information may include scheduling decision, information related to reference signal information, rules forming the corresponding transport block (TB) to be carried by PDSCH, and power control command. For radio resource management (RRM) measurement in NR, each UE can be configured to measure synchronization signal (SS) blocks (SSB) and/or channel state information (CSI) reference signal (CSI-RS). For CSI-RS measurement, both frequency and timing resources need to be determined.

CSI-RS are utilized by UEs to measure and feedback the characteristics of a DL channel so that gNB can use correct modulation, code rate, beam forming, etc. for DL data transmission. As depicted in FIG. 1, in step 111, gNB 101 provides CSI-RS configuration information, which allocates CSI-RS resources for periodic/semi-persistent or aperiodic CSI-RS transmission. In step 112, gNB 101 transmits CSI-RS to UE 102 accordingly. In step 113, UE 102 measures the received CSI-RS over a downlink channel, estimates the CSI, and reports the estimated CSI of the downlink channel to gNB 101. In step 114, gNB 101 receives the CSI reporting and schedules downlink data transmission to UE 102 based on the reported CSI.

In real developments, it is observed that the throughput drops significantly in high or medium velocity scenarios. One main reason is that the reported CSI becomes outdated due to fast channel variation. The CSI calculated for a past slot may not be useful at a later time when gNB needs to perform scheduling, especially in high velocity scenarios. To increase throughput, gNB needs to know the CSI that is good for future channels. The future CSI cannot be learned by a one-shot measurement as any channel variation requires at least two measurements to detect. The current NR specification supports consistent measurements for time/frequency tracking and beam management, but not for aperiodic CSI acquisition. For periodic and semi-persistent CSI-RS, the RRC parameter timeRestrictionForChannelMeasurements can be set to "not-Configured".

Channel variation can be observed in Doppler domain. In accordance with one novel aspect, a configuration method of CSI-RS repetition is proposed such that UE can acquire Doppler-domain information to support high velocity scenarios. In the example of FIG. 1, a CSI-RS resource can be configured by gNB 101 with a bursty period in which the same CSI-RS resource is repeatedly transmitted over time (e.g., step 111). Any two repetitions of the CSI-RS resource are not overlapped in time. For periodic and semi-persistent CSI-RS, the CSI-RS transmission has a periodicity, and the CSI-RS repetitions in the bursty period can be configured by radio resource control (RRC) signaling. For aperiodic CSI-RS, the CSI-RS transmission is triggered by a downlink control information (DCI), and the CSI-RS repetitions in the bursty period can be indicated by the triggering DCI. Upon receiving the CSI-RS transmission, UE 102 can acquire Doppler-domain information of the downlink channel based on the received CSI-RS repetitions during the bursty period to facilitate high velocity scenarios in NR systems.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules are circuits that can be configured and implemented by software, firmware, hardware, or any combination thereof. The function modules and circuits, when executed by the processors 203 and 213 (e.g., via executing program codes 209 and 219), for example, allow base station 201 to schedule (via scheduler 204), precode (via precoder 205), encode (via MIMO encoding circuit 206), and transmit control/config information and data (via control/config circuit 207) to UE 211, and allow UE 211 to receive the control/config information and data (via control/config circuit 217), measure CSI reference signal (via measurement circuit 216), estimate CSI (via estimation circuit 215), and report estimated CSI (via reporting circuit 220) accordingly.

In one example, a CSI-RS resource can be configured by control/config circuit 260 with a bursty period in which the same CSI-RS resource is repeatedly transmitted over time. Any two repetitions of the CSI-RS resource are not overlapped in time. For periodic and semi-persistent CSI-RS, the CSI-RS repetitions in the bursty period can be configured by radio resource control (RRC) signaling. For aperiodic CSI-RS, the CSI-RS repetitions in the bursty period can be indicated by the triggering downlink control information (DCI). UE can acquire Doppler-domain information based on the CSI-RS repetition to facilitate high velocity scenarios in NR systems.

Figure 3:
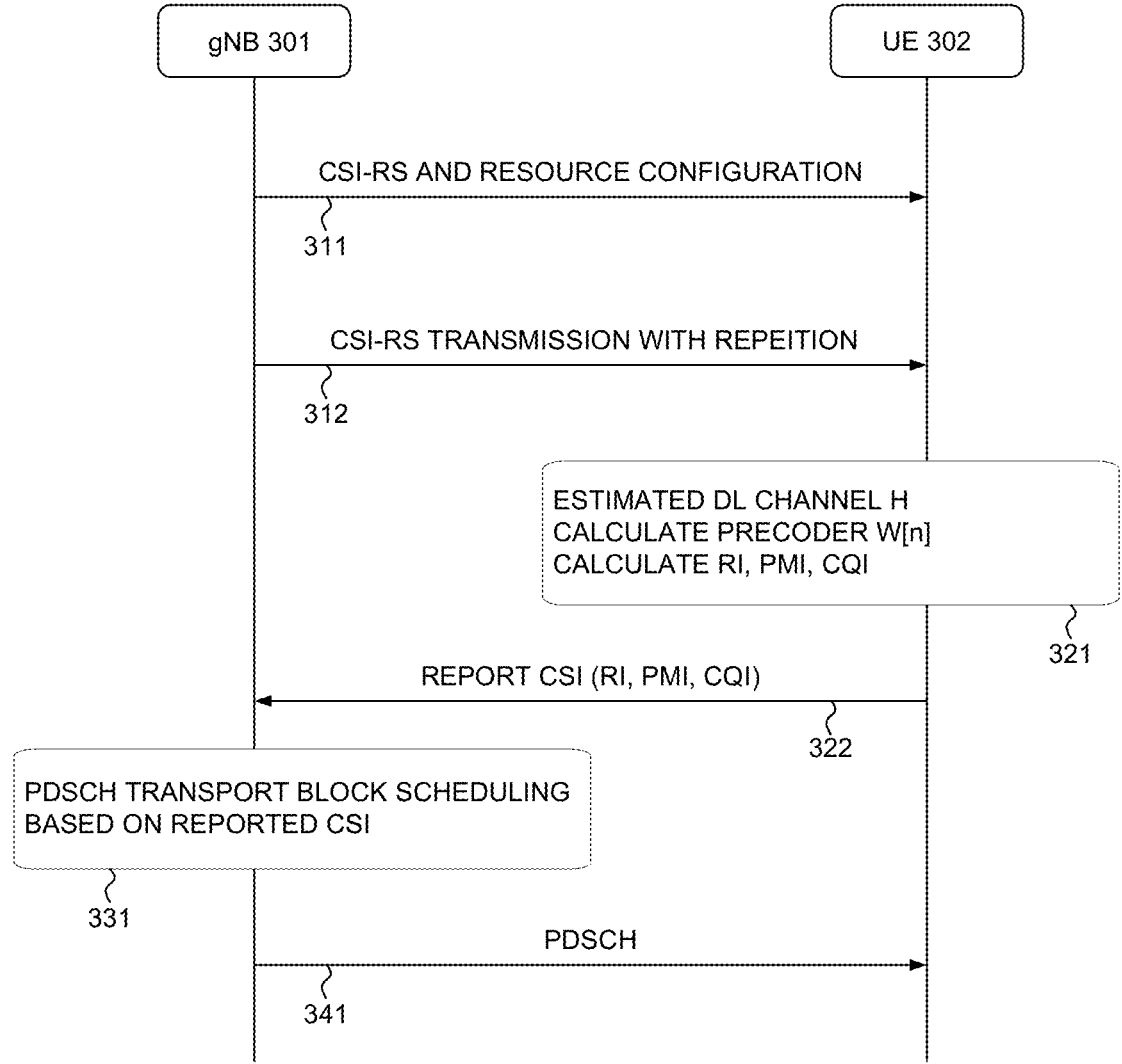
FIG. 3 illustrates a sequence flow of an overall procedure for CSI reference signal and resource configuration, CSI measurement, estimation, and reporting in accordance with one novel aspect.

FIG. 3 illustrates a sequence flow of an overall procedure for CSI reference signal and resource configuration, CSI measurement, estimation, and reporting in accordance with one novel aspect. In step 311, gNB 301 provides CSI configuration information to UE 302 for CSI acquisition and reporting. The CSI configuration information may comprise CSI-RS configuration, CSI-RS resource configuration with periodicity and CSI-RS repetition during bursty period, CSI reporting configuration, CSI reference slot for CSI measurement and computation, and CSI computation period, etc. In step 312, gNB 301 transmits multiple occasions of CSI reference signals to UE 302 over the configured CSI-RS resources accordingly. In step 321, UE 302 receives the multiple occasions of CSI reference signals, estimates the effective downlink channel, and performs CSI computation based on the CSI configuration information.

In one novel aspect, a CSI-RS resource can be configured with a bursty period in which the same CSI-RS resource is repeatedly transmitted over time. Any two repetitions of the CSI-RS resource are not overlapped in time. For periodic and semi-persistent CSI-RS, the CSI-RS repetitions in the bursty period can be configured by radio resource control (RRC) signaling. For aperiodic CSI-RS, the CSI-RS repetitions in the bursty period can be indicated by the triggering downlink control information (DCI). In step 322, UE 302 reports the computed CSI to gNB based on the CSI configuration information. The reported CSI parameters may include Rank Indicator (RI), Precoding Matrix Indicator (PMI), and Channel Quality Index (CQI). UE 302 can acquire Doppler-domain information of the downlink channel based on the CSI-RS repetition to facilitate high velocity scenarios.

With multiple CSI-RS repetitions, UE can measure the wireless channel at different times and thus detects channel variation over time. A bursty transmission helps detect time variation in a much smaller period than the original periodicity. Although the original periodicity can be set small to have the same effect, it incurs higher overhead comparing with a short bursty period. Through Fourier transform, the time variations of the channel in time domain become Doppler shifts in Doppler domain. Usually, the Doppler shifts are sparse in Doppler domain, which facilitates noise elimination and CSI compression. Furthermore, the time variation of a channel or its Doppler-domain equivalent are needed for CSI prediction. In step 341, gNB 301 transmits data to UE 302 over PDSCH using the determined parameters including modulation, code rate, beam forming.

A CSI-RS resource is defined with some parameters, e.g., number of ports, periodicity, bandwidth, etc. When multiple CSI-RS resources are configured, at least some of the parameters are different between two CSI-RS resources. As for CSI-RS repetitions, if they belong to the same CSI-RS resources, then all the properties are the same, except for the time-dependent parameters as they are transmitted at different times. CSI processing unit is defined as follows: If a UE supports $N_{CPU}$ simultaneous CSI calculations it is said to have $N_{CPU}$ CSI processing units (CPU) for processing CSI reports. As UE's capability is limited, the total number of CSI processing units is used to signal UE's capability so that gNB would not configure too many CSI calculations beyond UE's capability. Therefore, for a CSI report with CSI-ReportConfig with higher layer parameter reportQuantity set to 'cri-RI-PMI-CQI', 'cri-RI-i1', 'cri-RI-i1-CQI', 'cri-RI-CQI', or 'cri-RI-LI-PMI-CQI', the required number of CSI processing units $O_{CPU}$=KN, where K is the number of CSI-RS resources and N is the number of repetitions. Note that for UE's implementation that buffers N measurements first and then calculates CSI using the N measurements, N CPUs are needed. Besides, K is the number of CSI-RS resources in the CSI-RS resource set for channel measurement.

Figure 4:
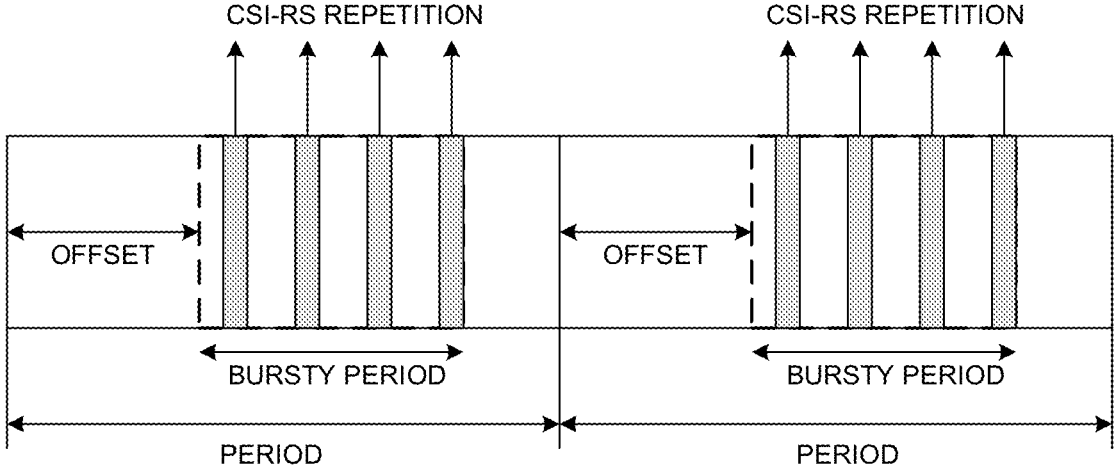
FIG. 4 illustrates one embodiment of CSI-RS and resource configuration for periodic or semi-persistent CSI-RS transmission to support high velocity scenario in accordance with one novel aspect.

FIG. 4 illustrates one embodiment of CSI-RS and resource configuration for periodic or semi-persistent CSI transmission to support high velocity scenario in accordance with one novel aspect. For periodic or semi-persistent CSI, the CSI-RS resource for CSI-RS transmission is configured with a periodicity in time domain. Within each period, a CSI-RS resource is configured with a bursty period, in which the same CSI-RS resource is repeatedly transmitted over time. The bursty period is less than or equal to the period. Any two repetitions of the CSI-RS resource are not overlapped in time. In a CSI-RS resource set, either all CSI-RS resources are configured with bursty period or none are configured with bursty period. All configured bursty periods have the same number of CSI-RS repetitions. All symbols of a bursty period are within the same period. The CSI-RS repetition starts from a symbol with an offset from the beginning of a slot of a bursty period. The last symbol of a CSI-RS resource configured with bursty period is the last symbol of its last repetition. For periodic CSI-RS transmission, the number of repetitions can be updated by RRC. For semi-persistent CSI-RS transmission, the number of repetitions can be updated by MAC-CE.

Figure 5:
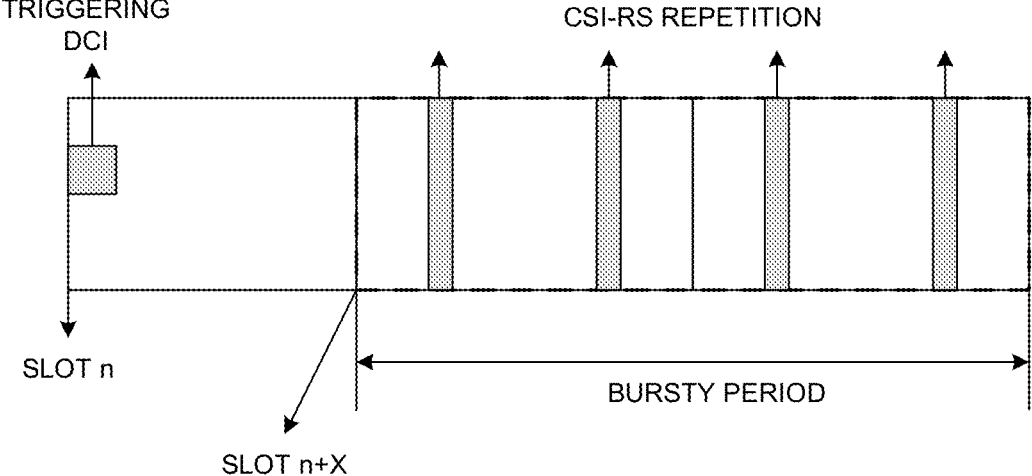
FIG. 5 illustrates one embodiment of CSI-RS and resource configuration for aperiodic CSI-RS transmission to support high velocity scenario in accordance with one novel aspect.

FIG. 5 illustrates one embodiment of CSI-RS and resource configuration for aperiodic CSI transmission to support high velocity scenario in accordance with one novel aspect. For aperiodic CSI, the CSI-RS resource for CSI-RS transmission is configured with a bursty period, in which the same CSI-RS resource is repeatedly transmitted over time. The CSI-RS transmission is triggered by a DCI, and the CSI-RS repetition is triggered at a later time. For example, as depicted in FIG. 5, the first slot of a bursty period is slot n+X, where n is the slot containing the triggering DCI and X is the CSI-RS triggering offset configured by RRC. For aperiodic CSI-RS transmission, the number of CSI-RS repetitions can be indicated by the triggering DCI.

Figure 6:
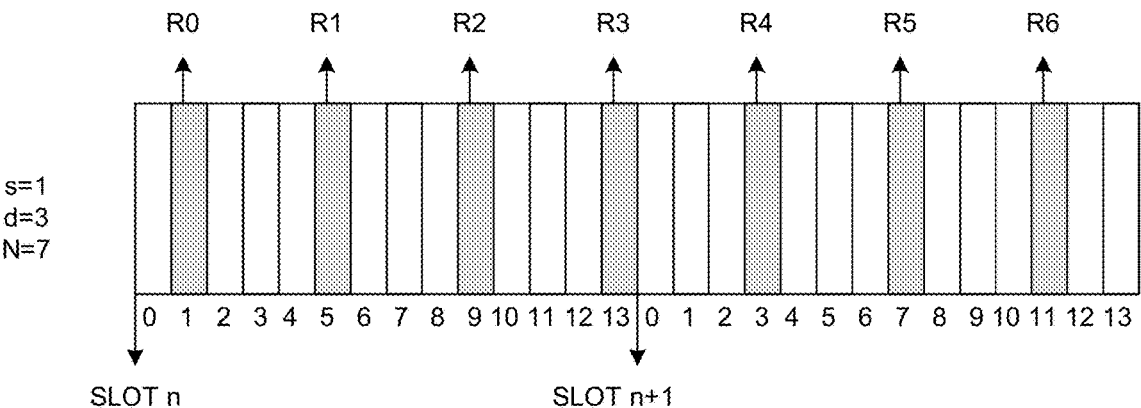
FIG. 6 illustrates one embodiment of equal-distance CSI-RS repetition.

FIG. 6 illustrates one embodiment of equal-distance CSI-RS repetition. The repetitions of CSI-RS in the bursty period are signalled by a symbol index s, a symbol gap d and a number N, where the CSI-RS resource is repeated every d symbols totally N times, starting from symbol s within the first slot of the bursty period. In the example of FIGS. 6, s=1, d=3, and N=7, which means that the CSI-resource starts from symbol s=1 of the first slot n, and is repeated every d=3 symbols for a total of N=7 times (R0-R6) during a configured bursty period. In this embodiment, the bursty period covers slot n and slot n+1, and every neighboring CSI-RS transmission is separated by equal distance of d=3 symbols.

Figure 7:
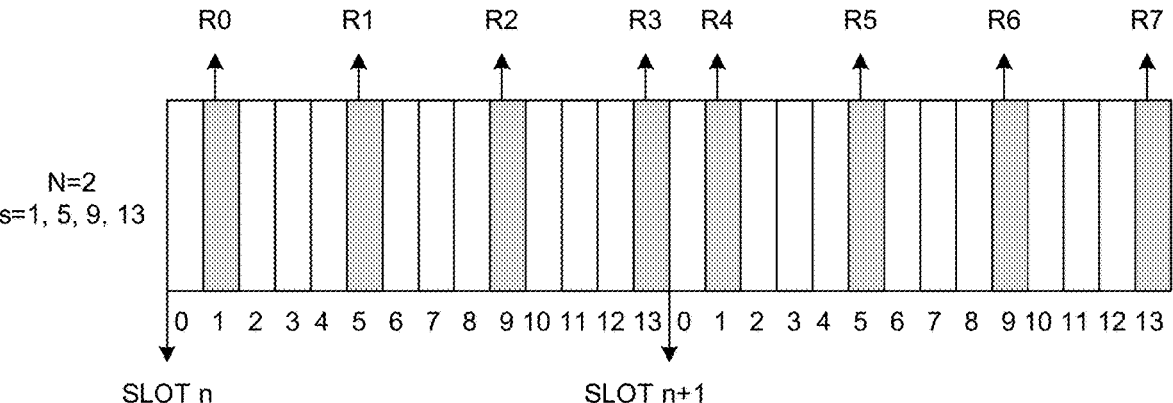
FIG. 7 illustrates one embodiment of slot-based CSI-RS repetition.

FIG. 7 illustrates one embodiment of slot-based CSI-RS repetition. The repetitions of CSI-RS in the bursty period are signalled by a number of slots (N) and the symbol position (s) within slot (s). The symbol positions are the same for each slot. In the example of FIGS. 7, N=2, and s=1, 5, 9, 13, which means that the bursty period lasts N=2 slots, and each CSI-RS resource occurs at symbol 1, 5, 9, and 13 for each slot. In this example, the CSI-RS transmission R0-R3 in slot n and R4-R7 in slot n+1 occur at the same symbols s=1, 5, 9, 13.

FIG. 8 is a flow chart of method of CSI-RS configuration with bursty period and repetition for periodic or semi-persistent CSI-RS transmission supporting high velocity in accordance with one novel aspect. In step 801, a UE receives channel state information reference signals (CSI-RS) configuration information for periodic or semi-persistent CSI-RS transmission from a base station (BS). In step 802, the UE determines a CSI-RS resource with a CSI-RS periodicity, and a CSI-RS is repeatedly transmitted during a bursty period within each CSI-RS period. In step 803, the UE measures a number of CSI-RS repetitions of a downlink channel that is received during the bursty period. In step 804, the UE estimates a CSI of the downlink channel based on the measurements on the number of CSI-RS repetitions. The UE acquires Doppler information from the number of CSI-RS repetitions during the bursty period.

FIG. 9 is a flow chart of method of CSI-RS configuration with bursty period and repetition for aperiodic CSI-RS transmission supporting high velocity in accordance with one novel aspect. In step 901, a UE receives channel state information reference signals (CSI-RS) configuration information for aperiodic CSI-RS transmission from a base station (BS). In step 902, the UE determines a triggering condition for an aperiodic CSI-RS transmission, and a CSI-RS is repeatedly transmitted during a bursty period. In step 903, the UE measures a number of CSI-RS repetitions of a downlink channel that is received during the bursty period. In step 904, the UE estimates a CSI of the downlink channel based on the measurements on the number of CSI-RS repetitions. The UE acquires Doppler information from the number of CSI-RS repetitions during the bursty period.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving, by a user equipment (UE), channel state information reference signals (CSI-RS) configuration information for periodic or semi-persistent CSI-RS transmission from a base station (BS);
determining a CSI-RS resource with a CSI-RS periodicity, wherein a CSI-RS is repeatedly transmitted during a bursty period within each CSI-RS period, wherein the bursty period is shorter than its corresponding CSI-RS period;
measuring a number of CSI-RS repetitions of a downlink channel that is received during the bursty period; and
estimating a CSI of the downlink channel based on the measurements on the number of CSI-RS repetitions.

2. The method of claim 1, wherein the CSI-RS repetition is signalled by a slot index s, a slot gap d and a number N, wherein the CSI-RS resource is repeated every d slots totally N times, starting from slot s.

3. The method of claim 1, wherein the CSI-RS repetition is signalled by a symbol index s, a symbol gap d and a number N, wherein the CSI-RS resource is repeated every d symbols totally N times, starting from symbol s within the first slot of the bursty period.

4. The method of claim 1, wherein the CSI-RS repetition in the bursty period is signalled by a number of slots and a symbol position within each slot.

5. The method of claim 1, wherein each configured bursty period has the same number of CSI-RS repetitions for CSI-RS resources in the same CSI-RS resource set.

6. The method of claim 1, wherein the number of CSI-RS repetitions is updated by MAC-CE for semi-persistent CSI-RS transmission.

7. The method of claim 1, wherein the UE is configured with a higher layer parameter for CSI reporting, wherein a required number of processing units $O_{CPU}$=KN, where K is the number of CSI-RS resources, and N is the number of CSI-RS repetitions.

8. A User Equipment (UE) comprising:
a receiver that receives channel state information reference signals (CSI-RS) configuration information for periodic or semi-persistent CSI-RS transmission from a base station (BS);
a control circuit that determines a CSI-RS resource with a CSI-RS periodicity, wherein a CSI-RS is repeatedly transmitted during a bursty period within each CSI-RS period, wherein the bursty period is shorter than its corresponding CSI-RS period;
a measurement circuit that measures a CSI-RS repetition of a downlink channel that is received during the bursty period; and
a CSI computation circuit that estimates a CSI of the downlink channel based on the measurements on the CSI-RS repetition.

9. The UE of claim 8, wherein the CSI-RS repetition is signalled by a slot index s, a slot gap d and a number N, wherein the CSI-RS resource is repeated every d slots totally N times, starting from slot s.

10. The UE of claim 8, wherein the CSI-RS repetition is signalled by a symbol index s, a symbol gap d and a number N, wherein the CSI-RS resource is repeated every d symbols totally N times, starting from symbol s within the first slot of the bursty period.

11. The UE of claim 8, wherein the CSI-RS repetition in the bursty period is signalled by a number of slots and a symbol position within each slot.

12. The UE of claim 8, wherein each configured bursty period has the same number of CSI-RS repetitions for CSI-RS resources in the same CSI-RS resource set.

13. The UE of claim 8, wherein the number of CSI-RS repetitions is updated by MAC-CE for semi-persistent CSI-RS transmission.

14. The UE of claim 8, wherein the UE is configured with a higher layer parameter for CSI reporting, wherein a required number of processing units $O_{CPU}$=KM, where K is the number of CSI-RS resources, and N is the number of CSI-RS repetitions.

15. A method comprising:
receiving, by a user equipment (UE), channel state information reference signals (CSI-RS) configuration information for aperiodic CSI-RS transmission from a base station (BS);
determining a triggering condition for an aperiodic CSI-RS transmission, wherein a CSI-RS is repeatedly transmitted during a bursty period, wherein the bursty period is shorter than its corresponding CSI-RS period;
measuring a number of CSI-RS repetitions of a downlink channel that is received during the bursty period; and estimating a CSI of the downlink channel based on the measurements on the number of CSI-RS repetitions.

16. The method of claim 15, wherein the UE receives a downlink control information (DCI) for triggering the aperiodic CSI-RS transmission.

17. The method of claim 16, wherein the number of CSI-RS repetitions is indicated by the triggering DCI.

18. The method of claim 16, wherein the triggering DCI occurs in slot n, and the number of CSI-RS repetitions starts from slot n+X, wherein X is the CSI-RS triggering offset.

19. The method of claim 18, wherein the CSI-RS triggering offset X is configured by a radio resource control (RRC) signaling.

20. The method of claim 15, wherein the UE is configured with a higher layer parameter for CSI reporting, wherein a required number of processing units $O_{CPU}$=KN, where K is the number of CSI-RS resources, and N is the number of CSI-RS repetitions.

* * * * *